United States Patent [19]
Fitzpatrick

[11] Patent Number: 5,200,141
[45] Date of Patent: Apr. 6, 1993

[54] THERMIONIC FUEL ELEMENT

[75] Inventor: Gary O. Fitzpatrick, Poway, Calif.

[73] Assignee: Advanced Energy Technology, Inc., City of Poway, Calif.

[21] Appl. No.: 741,790

[22] Filed: Aug. 6, 1991

[51] Int. Cl.⁵ .............................................. G21D 7/00
[52] U.S. Cl. ................... 376/321; 376/289; 376/320
[58] Field of Search ............... 376/321, 320, 289, 411; 301/306; 136/202

[56] References Cited

U.S. PATENT DOCUMENTS

| | | | |
|---|---|---|---|
| 3,843,896 | 11/1974 | Rason et al. | 301/4 |
| 3,863,081 | 1/1975 | Jules et al. | 310/4 |
| 4,040,903 | 8/1977 | Monroe, Jr. | 376/321 |

OTHER PUBLICATIONS

A Nuclear Thermionic Space Power Concept Using Rod Control and Heat Pipes. by John L. Anderson et al. Nuclear Applications vol. 6 Dec. 1968. pp. (424-436).

Primary Examiner—Donald P. Walsh
Assistant Examiner—Meena Chelliah
Attorney, Agent, or Firm—Fliesler, Dubb, Meyer & Lovejoy

[57] ABSTRACT

An improvement is set forth in a thermionic fuel element which includes a collector base supporting a collector adjacent and closely spaced from an emitter which is supported by an emitter base, the emitter base being adapted to be heated by a heat source. In accordance with the invention a thermal shield structure is located between a portion of the emitter and the collector. The shield structure insulates that portion of the collector opposite the shield structure from receiving at least a portion of the radiation developed by the heat source.

16 Claims, 5 Drawing Sheets

THERMIONIC FUEL ELEMENT

DESCRIPTION

1. Technical Field

The present invention relates to a thermionic fuel element which utilize thermionics to generate electricity with the energy for heating the emitter being supplied, for example, by a fissioning nuclear fuel.

2. Background Of The Invention

In some nuclear power system applications of in-core thermionics, particularly in space applications, emitter distortion is a life limiting factor. In essence, if the emitter becomes too hot it can swell and distort, thereby shorting to a closely spaced collector. This is exacerbated by high emitter temperature and high fuel power density present in typical applications.

The in-core thermionic nuclear reactor is a leading candidate for low power space systems requirements. The thermionic converters are static devices which convert heat directly to electricity in the form of high current, low voltage output power. Nuclear fuel cladding is used as the emitting electrode and is surrounded with close spacing by the collector electrode. Stability and lifetime of the system depend on the maintenance of the interelectrode gap established by the resulting coaxial geometry.

Factors effecting the stability include the cladding strength, fuel swelling, and fuel temperature. A thermionic fuel element which would allow tradeoffs to be made amongst emitter distortion, emitter temperature and lifetime while increasing fuel-volume ratio and eliminating the driver in the low power level design would be highly desirable.

The present invention is directed to overcoming one or more of the problems as set forth above.

DISCLOSURE OF INVENTION

In accordance with an embodiment of the present invention an improvement is set forth in a thermionic fuel element which includes a generally tubular collector base having a bore supporting a collector surrounding and closely spaced but not in contact with a generally concentric emitter which is supported by a generally concentric emitter base, the emitter base defining a central lumen containing a fissioning nuclear fuel. The improvement comprises a thermal shield structure between a portion of the emitter and the collector, the shield structure being adapted to insulate that portion of the collector opposite the shield structure from receiving at least a portion of the heat developed by the fuel.

In accordance with another embodiment of the present invention an improvement is set forth in a thermionic fuel element which includes a collector closely spaced but not in contact with an adjacent emitter which is supported by an emitter base, the emitter base being adapted to be heated by a heat source. The improvement comprises a thermal shield structure between a portion of the emitter and the collector, the shield structure being adapted to insulate that portion of the collector opposite the shield structure from receiving at least a portion of the heat developed by the heat source.

The thermal shield structure may be made of one or more metal and/or ceramic sheets. A dielectric layer may be included to position the emitter and collector relative to one another and to provide electrical insulation.

An improvement as set forth above allows trade offs to be made amongst emitter distortion, emitter temperature and lifetime and, when the heat source is a fissioning nuclear fuel, increases fuel-volume ration while eliminating the driver in the low power level core design. A thermionic fuel element (hereinafter sometimes referred to as "pin') can be enlarged while maintaining the same per cell output power. The linear fuel power density is reduced and hence the fuel and emitter distortion is greatly reduced. For example, by doubling the pin diameter, the same cell output power can be maintained with one-fourth of the linear fuel density, with an accompanying reduction by a factor of four in the percent distortion of the emitter. A reduction in absolute distortion by a factor of two can be achieved for the same cladding (emitter) thickness. With the large fuel pin size, the thickness can be increased. In any case, the electrode (pin) resistive losses decrease and therefore axially longer cells become practical. Also, because of the large fuel pin size, the fuel to volume ratio is still adequate to realize sufficient excess reactivity.

BRIEF DESCRIPTION OF THE DRAWINGS

The invention will be better understood by reference to the figures of the drawings wherein like numbers denote like parts throughout and wherein.

BEST MODE FOR CARRYING OUT INVENTION

Figure 1:
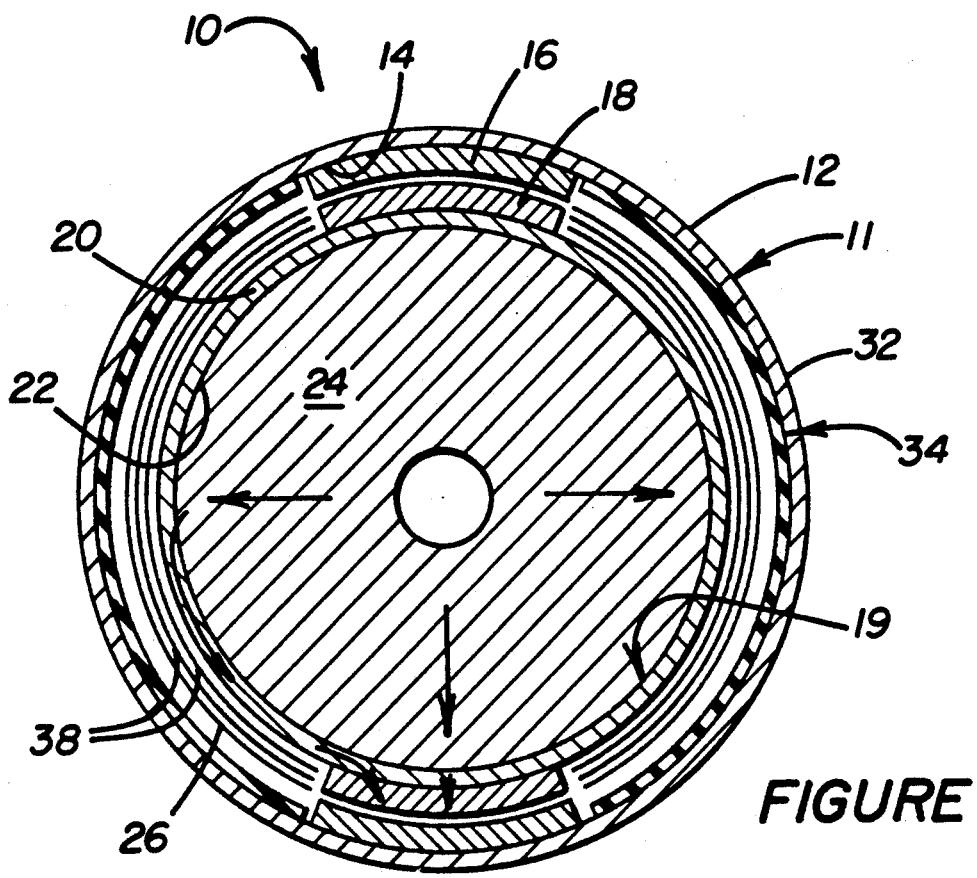
FIG. 1 is a cross-sectional view of a cylindrical thermionic fuel element with partial radiation insulation in accordance with an embodiment of the present invention.
Figure 3:
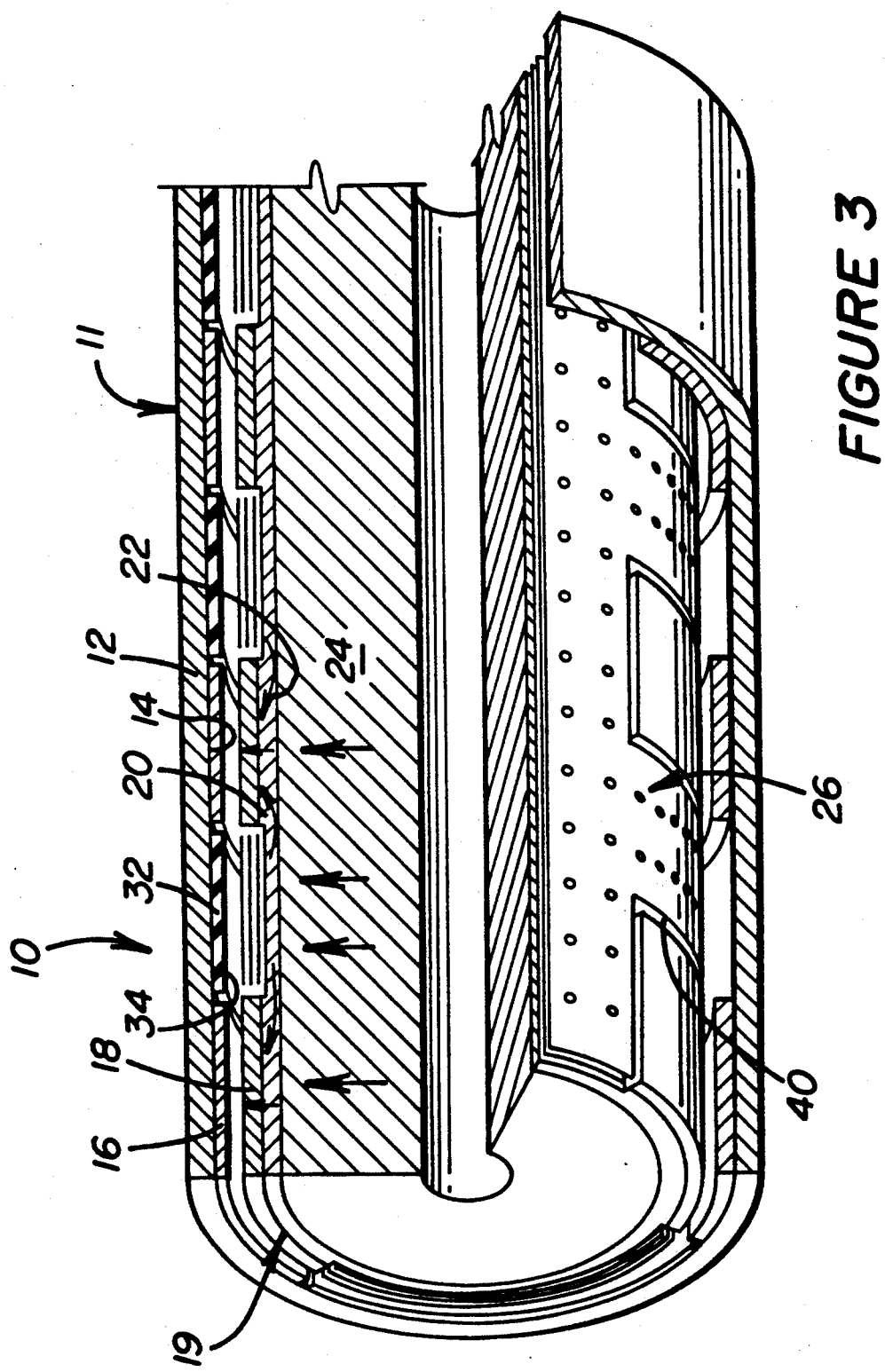
FIG. 3 is an isometric cut away view of the embodiment of the thermionic fuel element of FIG. 1.

In accordance with the present invention an improved thermionic fuel element 10 is set forth which, in accordance with the embodiment illustrated in FIGS. 1 and 3, includes a generally tubular outer collector 11 which includes a collector base 12 having a bore 14. The collector base 12 supports a collector portion 16, which may, if desired, be integral with the collector base 12 but is not shown as such. The bore 14 surrounds and is closely spaced from but is not in contact with a generally concentric cylindrical emitter 19 which includes an emitter base portion 20. An emitter section 18 is supported by, and may optionally be integral with (but is not shown as such), the generally concentric emitter base portion 20. The emitter base portion 20 defines a central lumen 22 containing fissioning nuclear fuel 24 which, when such thermionic elements 10 are assembled in a nuclear critical configuration, serves as the source of heat to the thermionic converter.

In accordance with the present invention a thermal shield structure 26 is located azimuthally outside of and supported by the emitter 19 between the emitter 19 and the collector base 12 other than opposite the emitter sections 18. The shield structure 26 is adapted to thermally insulate that portion 32 of the collector 11 which is opposite the shield structure 26 from receiving at least a portion of the thermal radiation arising from the heat developed by the fuel 24. As is illustrated in the figures, the shield structure 26 may include a plurality of metal or ceramic sheets 38.

In accordance with an embodiment of the present invention a dielectric structure 34 is located between the shield structure 26 and that portion 32 of the collector base 12 opposite the shield structure 26. This provides proper positioning and spacing of the emitter section 18 relative to the collector 16 along with electrical isolation. If other secure means of providing proper spacing and preventing contact between components is provided, the dielectric structure 34 may be omitted. The dielectric structure 34 generally comprises a ceramic material.

Figure 2:
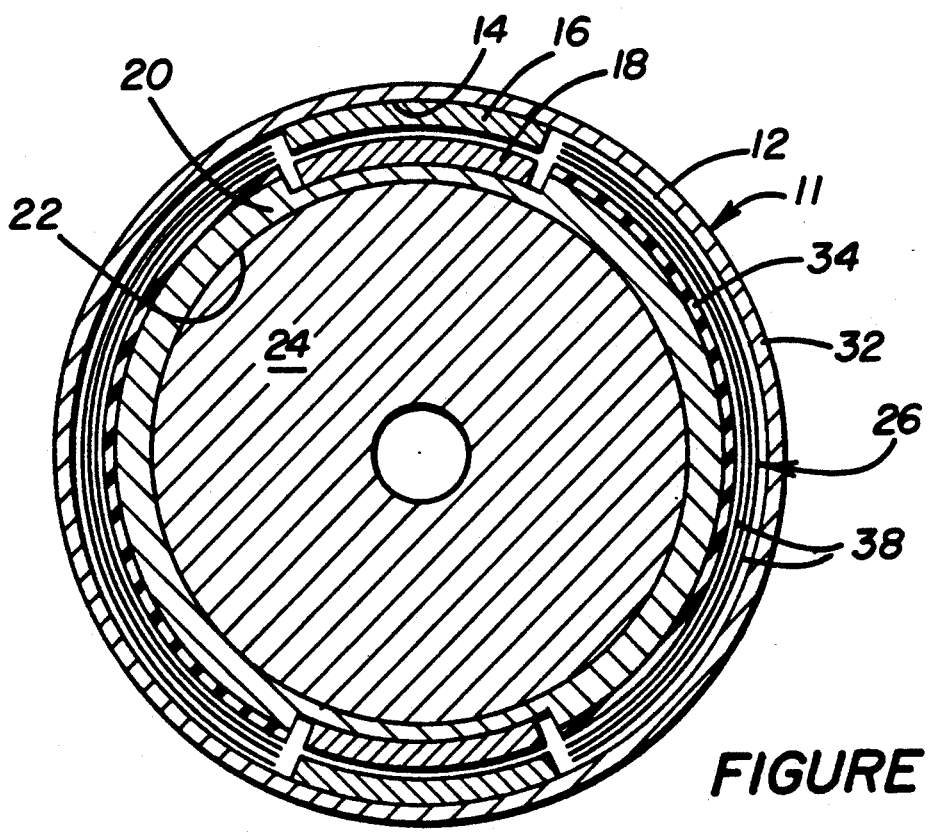
FIG. 2 is a view similar to FIG. 1 but showing an alternative cylindrically symmetrical embodiment in accordance with the present invention.

In the alternative embodiment illustrated in FIG. 2, the thermal shield structure 26 is located inside of and supported by the collector base 12 azimuthally between the collector sections 16 and opposite the emitter base 20 and the dielectric structure 34 is correspondingly relocated.

Generally, the portions of the emitter section 18 which are not shielded by the shield structure 26 will be in the nature of a plurality of windows 40 (see FIG. 3) in the shield structure 26, for example in the metal or ceramic sheets 38. The dielectric structure 34 is not present opposite the windows 40.

As an alternate embodiment of the present invention there may be a plurality of the shield elements 26 spaced apart from one another along the length of the thermionic fuel element 10 with, generally, dielectric structures 34 opposite each of them. Thus, for example, if desired the shield structure 26 can be in the nature of a plurality of annular sheets spaced apart from one another along the length of the thermionic fuel element 10 and with appropriate dielectric structures 34 opposite each of the annular shield structures 26. In such an embodiment there are, in essence, a plurality of annular emitter sections 18 supported by corresponding emitter base portion 20 and the areas between each emitter section 18 is shielded by the respective shield structure 26 and the respective dielectric structure 34.

Figure 4:
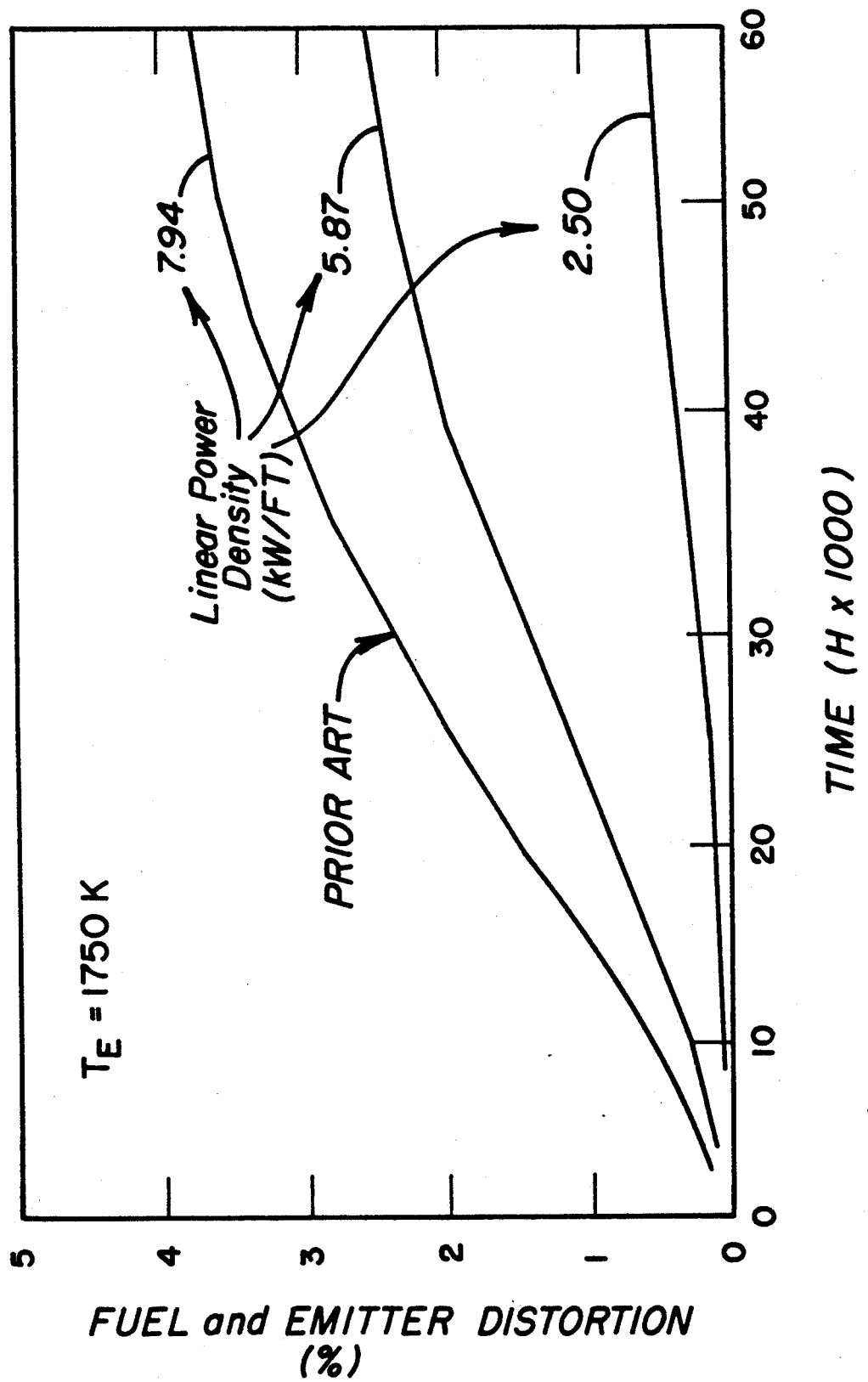
FIG. 4 is a graph of fuel and emitter distortion as a function of time as a function of linear power density at an emitter temperature of 1750° K.

The benefits of the invention arise from two specific features. The pin size can be enlarged while maintaining the same per cell output power. The linear fuel power density is reduced and, hence, the fuel and emitter distortion is greatly reduced. The effect of linear power density on distortion as a function of time is shown in FIG. 4.

Figure 5:
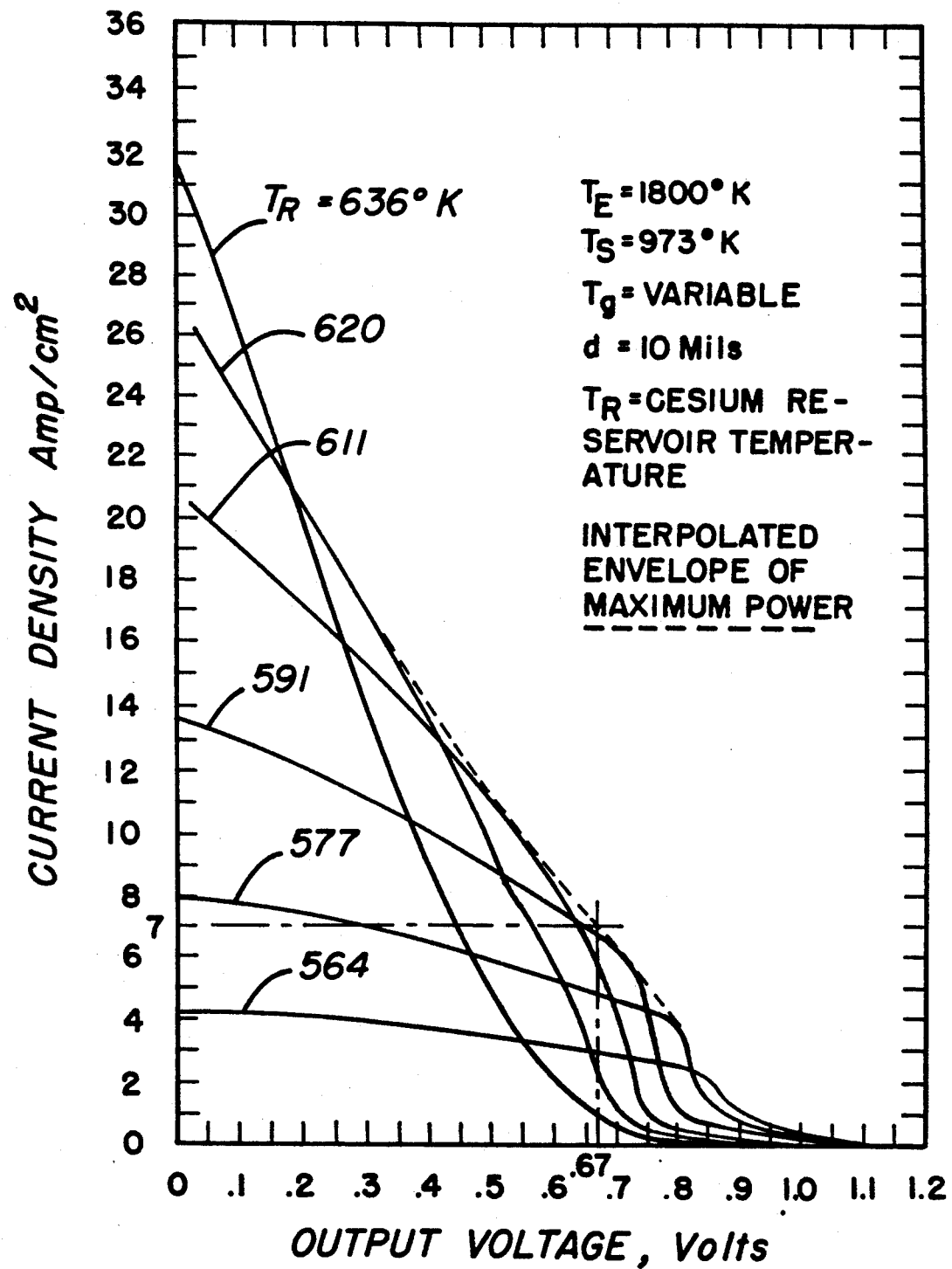
FIG. 5 is a graph of current density as a function of output voltage at several $T_R$ where $T_R$ is the cesium reservoir temperature.

In order to better understand the invention an example may be of benefit. In a conventional converter utilizing a tungsten (110) emitter and a niobium collector, the input power, near the optimum operating point, and with an optimum (10% loss) lead, is given by $$Q_{in} = 1.8 \times 10^{-3} JT_E + 1.2 \times 10^{-12}(T_E^4 - T_C^4)$$

where
J = Current density (A/cm$^2$)
$T_E$ = Emitter Temperature
$T_C$ = Collector Temperature
and the interelectrode emissivity = 0.2. As seen in FIG. 5 at $T_E$ = 1800° K., $T_C$ = 973° K., J = 7 A/cm$^2$, and d = 10 mils, the electrode output voltage is about 0.67 volts as shown by the intersection with the dashed envelope curve. The optimum lead output power (P) is given by $$P = 0.64 \times 7 \times 0.9 = 4.0 \ W/cm^2$$

assuming the electrical losses in the electrodes are negligible. Then $$Q_{in} = 22.7 + 11.5 = 34.2 \ W/cm^2$$

and efficiency ($\eta$) is given by $$\eta = 4.0/34.2 = 11.7\%.$$

For a thermionic fuel element 10 in accordance with the present invention with one-third the emitter area and two-thirds thermal radiation shielding, and if the shielding is 75% effective, then the input power is $$Q_{in}' = 3.42 x + 11.5 x x 0.25$$
$$= 11.4 + 2.0 = 13.4 \ W/cm^2$$

then $$\eta' = \frac{x \ 4.0 \ W/cm^2}{13.4 \ W/cm^2} = 10.0\%$$

The result is more than a 60% reduction in input power density with only a 20% reduction in lead efficiency. The output power also would be increased by the reduction of electrode electrical loss (~10% of output voltage) because the emitter cross-sectional area is increased. This could reduce the difference in efficiencies to 10%.

However, the enormous decrease in fuel power density and decrease in emitter distortion in the enlarged fuel pin thermionic fuel element 10 can be balanced against high emitter temperature, spacing or other reactor core and radiator size to achieve a desirable system design.

Figure 6:
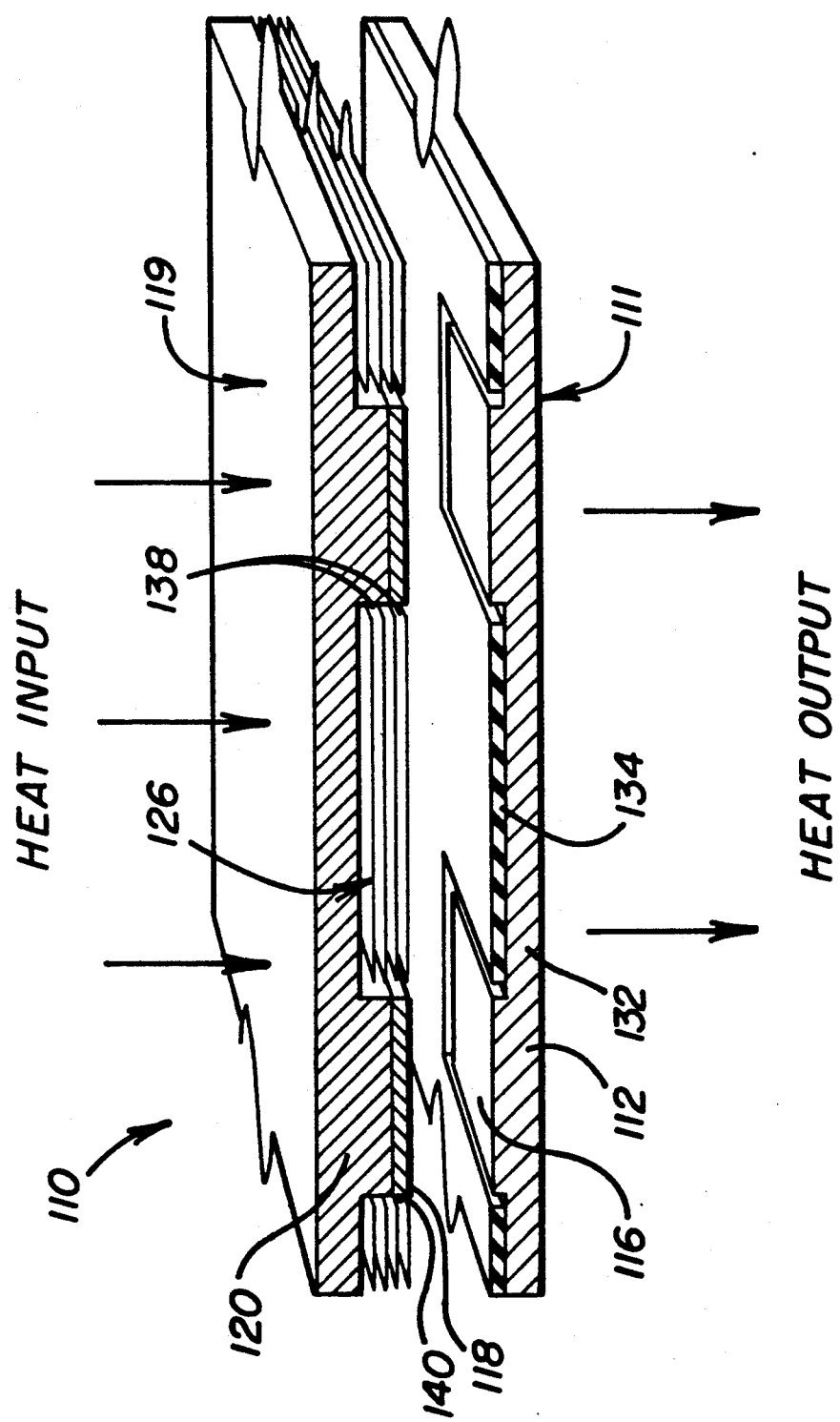
FIG. 6 is a partial cross-sectional isometric view of a generally flat thermionic fuel element in accordance with an embodiment of the invention.

FIG. 6 illustrates an embodiment of the invention wherein a non-cylindrical, for example, a generally flat, thermionic fuel element 110 is provided in accordance with an embodiment of the invention. In the embodiment of FIG. 6 a generally flat collector 111 includes a collector base 112 which supports a collector portion 116 which, if desired, may be integral with the collector base 112. An emitter 119 includes an emitter section 118 which is supported by a generally parallel emitter base portion 120, which, if desired, may be integral with the emitter section 118. A heat source, for example, a fissioning nuclear fuel, solar radiation or heat from a furnace, is located so as to provide a heat input to the emitter 119.

In accordance with the embodiment of the invention illustrated in FIG. 6, a thermal shield structure 126 is located between the emitter 119 and the collector 111. The thermal shield structure 126 has windows 140 through it opposite the collector portion 116. The shield structure 126 is adapted to thermally insulate a base portion 132 of the collector base 112 opposite which it is located from receiving at least a portion of the thermal radiation resulting from radiation from the emitter base portion 120. The shield structure may include a plurality of ceramic or metal sheets 138.

A dielectric structure 134 can be located between the shield structure 126 and that portion 132 of the collector base 112 which is opposite the shield structure 126 and in contact with both so as to provide support for the emitter base 120 and for the collector base 112 such that the collector portion 116 and the emitter portion 118 are properly spaced apart from one another. If other secure means of positioning and preventing contact between the components are provided the dielectric structure 134 can be omitted.

Industrial Applicability

In accordance with the present invention an improved thermionic fuel element 10, 110 is set forth which allows a balance between such factors as emitter distortion, emitter temperature and lifetime and which increases fuel to volume ratio and eliminates the driver in the low power level core design.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a thermionic fuel element including a collector base having a bore supporting a collector surrounding and closely spaced but not in contact with a generally concentric emitter which is supported by a generally concentric emitter base, the emitter base defining a central lumen containing a fissioning nuclear fuel, an improvement which comprises:
   a thermal shield structure between a portion of said emitter and said collector, said shield structure being adapted to thermally insulate that portion of said collector opposite the shield structure from receiving at least a portion of the heat developed by said fuel.

2. A thermionic fuel element as set forth in claim 1, further including:
   a dielectric structure between said shield structure and that portion of said collector opposite said shield structure.

3. A thermionic fuel element as set forth in claim 2, wherein said shield structure includes a plurality of sheets.

4. A thermionic fuel element as set forth in claim 3, wherein said shield structure includes a plurality of shield elements spaced apart from one another.

5. A thermionic fuel element as set forth in claim 1, wherein said shield structure includes a plurality of shield elements spaced apart from one another.

6. A thermionic fuel element as set forth in claim 5, wherein said shield elements include a plurality of sheets.

7. A thermionic fuel element as set forth in claim 6, further including:
   dielectric structures between each of said shield elements and that portion of said collector opposite each of said shield elements.

8. In a thermionic fuel element including a collector closely spaced but not in contact with an emitter which is supported by an emitter base, the emitter base being adapted to be heated by a heat source, an improvement which comprises:
   a thermal shield structure between a portion of said emitter and said collector, said shield structure being adapted to thermally insulate that portion of said collector opposite the shield structure from receiving at least a portion of the heat developed by the heat source.

9. A thermionic fuel element as set forth in claim 8, further including:
   a dielectric structure between said shield structure and that portion of said collector opposite said shield structure.

10. A thermionic fuel element as set forth in claim 9, wherein said shield structure includes a plurality of sheets.

11. A thermionic fuel element as set forth in claim 10, wherein said shield structure includes a plurality of shield elements spaced apart from one another.

12. A thermionic fuel element as set forth in claim 8, wherein said shield structure includes a plurality of shield elements spaced apart from one another.

13. A thermionic fuel element as set forth in claim 12, wherein said shield elements include a plurality of sheets.

14. A thermionic fuel element as set forth in claim 13, further including:
   dielectric structures between each of said shield elements and that portion of said collector opposite each of said shield elements.

15. A thermionic fuel element as set forth in claim 1, wherein said thermal shield structure is free from physical contact with said collector.

16. A thermionic fuel element as set forth in claim 8, wherein said thermal shield structure is free from physical contact with said collector.

* * * * *